United States Patent
Kin

(10) Patent No.: US 8,830,964 B2
(45) Date of Patent: Sep. 9, 2014

(54) MOBILE NETWORK HANDOVER INITIATION

(75) Inventor: Tan Tat Kin, Penang (MY)

(73) Assignee: Intel Corporation, Santa Clara, CA (US)

( * ) Notice: Subject to any disclaimer, the term of this patent is extended or adjusted under 35 U.S.C. 154(b) by 1455 days.

(21) Appl. No.: 12/143,878

(22) Filed: Jun. 23, 2008

(65) Prior Publication Data

US 2009/0316658 A1 Dec. 24, 2009

(51) Int. Cl.
*H04W 4/00* (2009.01)
*H04L 12/66* (2006.01)
*H04M 11/00* (2006.01)

(52) U.S. Cl.
USPC ........... 370/332; 370/331; 370/338; 370/352; 455/403

(58) Field of Classification Search
USPC ........... 370/331, 332, 338; 455/438, 439, 440
See application file for complete search history.

(56) References Cited

U.S. PATENT DOCUMENTS

| | | | |
|---|---|---|---|
| 2002/0042273 A1* | 4/2002 | Sasaki et al. | 455/442 |
| 2002/0058480 A1* | 5/2002 | Ikeda | 455/67.1 |
| 2005/0053034 A1* | 3/2005 | Chiueh | 370/331 |
| 2005/0250469 A1* | 11/2005 | Laroia et al. | 455/403 |
| 2005/0255847 A1* | 11/2005 | Han et al. | 455/436 |
| 2006/0094432 A1* | 5/2006 | Chang et al. | 455/439 |
| 2007/0076661 A1* | 4/2007 | Lin et al. | 370/331 |
| 2007/0140220 A1* | 6/2007 | Doradla et al. | 370/352 |
| 2007/0153687 A1* | 7/2007 | Attar et al. | 370/229 |
| 2007/0234036 A1 | 10/2007 | Tan et al. | |
| 2008/0014934 A1* | 1/2008 | Balasubramanian et al. | 455/434 |
| 2008/0153495 A1* | 6/2008 | Ogami et al. | 455/436 |

OTHER PUBLICATIONS

Kin, Tan T., "Fast Path Packet Destination Mechanism for Network Mobility Via Secure PKI Channel", U.S. Appl. No. 11/776,926, filed Jul. 12, 2007.

* cited by examiner

*Primary Examiner* — Ian N Moore
*Assistant Examiner* — Kiet Tang
(74) *Attorney, Agent, or Firm* — Garrett IP, LLC

(57) ABSTRACT

Methods and systems to monitor wireless signal strengths associated with wireless access points, and to initiate a handover procedure upon one or more thresholds. A handover may be initiated prior to a loss of an existing network connection.

18 Claims, 4 Drawing Sheets

MOBILE NETWORK HANDOVER INITIATION

BACKGROUND

In mobile networking, a mobile node may roam, or switch amongst multiple wireless access points to one or more networks. A corresponding home agent may be configured to route messages between the mobile node and one or more correspondent nodes, as the mobile node roams.

Mobile nodes include individual mobile hosts and mobile routers. Protocols for mobile hosts have been published as a Request for Comments (RFC) 3775, titled, "Mobility Support in IPv6," published by The Internet Engineering Task Force, Network Working Group, June, 2004, available at http://www.ietf.org/rfc/rfc3775. txt, (hereinafter, MIPv6).

Mobile routers are configured to provide network access to one or more of mobile hosts and stationary hosts. A mobile router may connect to a network through one or more other mobile routers in a nested fashion. Protocols for mobile router have been published as a RFC 3963, titled, "NEMO Basic Support Protocol," published by The Internet Engineering Task Force, Network Working Group, January, 2005, available at http://rfc.net/rfc3963. html#s6.2., (hereinafter, NEMO). NEMO is an extension of MIPv6, direct to mobile networks.

Roaming between wireless access points invokes a relatively elaborate handover procedure, which may include obtaining a new address or care-of-address from a new wireless access point, providing the new address to one or more home agents and correspondent nodes, and authenticating an identity of the roaming mobile node. The updating of addresses and the authentication may involve bidirectional communications with multiple devices, and the authentication may be performed with one or more of the multiple devices.

When a mobile node moves out of signal range of a wireless access point, the mobile node loses contact with the network. Until the mobile node reestablishes contact with the network through another access point, messages to and from the mobile node may be buffered for later delivery.

BRIEF DESCRIPTION OF THE DRAWINGS/FIGURES

Figure 1:
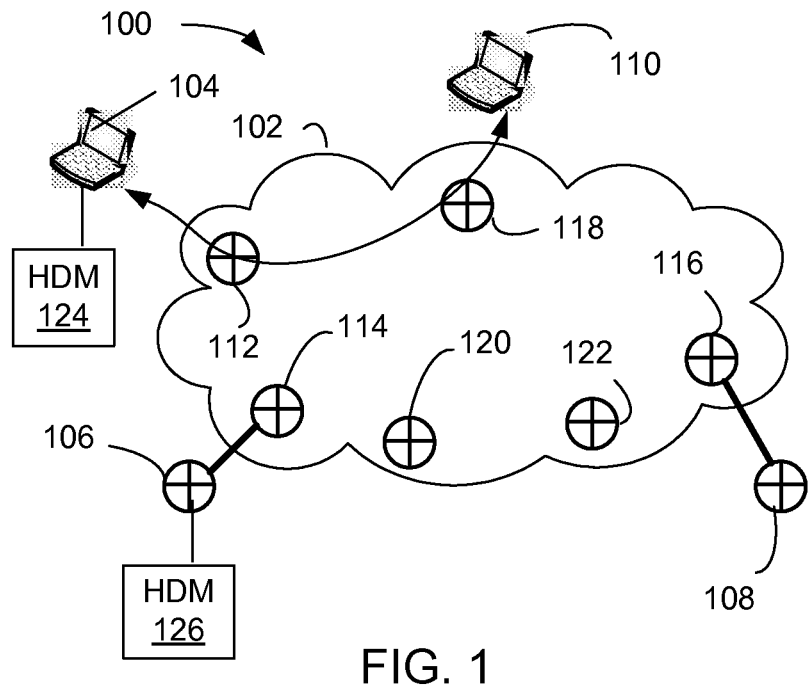
FIG. 1 is a graphical illustration of an exemplary network environment.

In the drawings, the leftmost digit(s) of a reference number identifies the drawing in which the reference number first appears.

DETAILED DESCRIPTION

Disclosed herein are methods and systems to monitor wireless signal strengths associated with wireless access points, and to initiate a handover procedure upon one or more thresholds. A handover may be initiated prior to a loss of an existing network connection.

Methods and systems disclosed herein may be implemented within mobile nodes, including mobile hosts and mobile routers, and may be implemented in software, firmware, hardware, and/or combinations thereof. Methods and systems disclosed herein may be implemented within and/or in combination with one or more mobile networking protocols including, without limitation, MIPv6 and NEMO.

FIG. 1 is a graphical illustration of an exemplary network environment 100, including one or more networks 102. Network 102 may include, without limitation, one or more of a computer network, a public network, a proprietary network, the Internet, a local area network (LAN), a wide area local network (WLAN), a wide area network (WAN), a metropolitan area network (MAN), a personal area network (PAN), and a wired network, and a wireless network.

Network environment 100 includes one or more mobile nodes, which may include one or more of a mobile host and a mobile router. A mobile host may be implemented in accordance with MIPv6. A mobile router may be implemented in accordance with MIPv6 and NEMO extensions thereto. A mobile host may connect to network 100 through one or more of a fixed-position wireless access point and a mobile router. A mobile router may connect to network 100 through one or more of a fixed-position wireless access point and one or more other mobile routers.

Under MIPv6, a mobile node may move from one access point, or link, to another without changing the mobile node's home address. A home address is an internet protocol (IP) address assigned to the mobile node within a home subnet prefix on a home link. The mobile node is addressable at the home address, even when it is attached to another link.

When a mobile node is attached to a link away from home, it may also be addressable at one or more care-of addresses. A care-of address is an IP address associated with a mobile node that has the subnet prefix of a foreign link. While a mobile node is at a foreign location, packets addressed to the care-of address will be routed to the mobile node.

Message forwarding is handled by a home agent. A home agent is a router on a home link of a mobile node with which the mobile node has registered a care-of address. While the mobile node is away from home, the home agent intercepts packets on the home link destined to the home address of the mobile node, encapsulates the packets, and tunnels them to the registered care-of address of the mobile node.

A dynamic home agent address discovery (DHAAD) mechanism allows a mobile node to dynamically discover the IP address of a home agent on its home link.

An association or registration of a home address of a mobile node with a care-of address for the mobile node is referred to as a binding or binding update. A binding is registered with a home agent through a return routability registration procedure during which a mobile node sends a binding to its home agent. The home agent replies with a confirmation message and records the binding. Registration may include an authorization procedure to verify an identification and/or authorization of the mobile node.

A node that communicates with a mobile node is referred to as a correspondent node of the mobile node. A mobile node and a correspondent node may communicate in a bidirectional tunneling mode or in a more direct route optimization mode.

In bidirectional tunneling, packets from the correspondent node are routed to the home agent of the mobile node. The home agent intercepts the packets and tunnels them to the care-of address of the mobile node. Packets from the mobile node to the correspondent node are tunneled from the mobile node to the home agent, which routes the packets to the correspondent node.

In route optimization, a mobile node registers a current binding, or current care-of address with a correspondent node. Packets from the correspondent node may then be routed directly to the care-of address of the mobile node.

NEMO is an extension of MIPv6, directed to mobile networks. Under NEMO, a mobile node may be configured as a mobile router. To initiate mobile routing, a mobile node sends a binding update to the home agent, with a mobile router flag (R) set in a header of a dynamic home agent address discovery (DHAAD) message.

The home agent acknowledges the binding update by sending a binding acknowledgement to the mobile node. A positive acknowledgement with the mobile router flag (R) set indicates that the home agent has set up forwarding for the mobile node, effectively configuring the mobile node as a mobile router. The mobile router and home agent together define a mobile network.

A bi-directional tunnel is then established between the home agent and the mobile router. The tunnel end points are the care-of-address of the mobile router and the address of the home agent. The mobile router forwards packets from nodes coupled to the mobile router, to the home agent. The home agent forwards the packets to correspondent nodes.

When a correspondent node sends a data packet to a node in the mobile network, the packet is routed to the home agent that currently has the binding for the mobile router. The home agent tunnels the packet to the current care-of-address of the mobile router, and the mobile router forwards the packet to the node.

In the example of FIG. 1, network environment 100 includes mobile nodes 104, 106, 108, and 110, and corresponding home agents 112, 114, 116, and 118. Mobile nodes and corresponding home agents may be part of corresponding home networks within or external of network 102.

Mobile nodes 104 and 110 are illustrated as mobile hosts, which may be configured in accordance with MIPv6. Mobile node 110 is illustrated as a correspondent node of mobile node 102.

Mobile nodes 106 and 108 are illustrated as mobile routers, which may be configured in accordance with NEMO.

Home agents 112, 114, 116, and 118, and mobile routers 106 and 108, may serve as access points to network 100. Additional access points may include access points 120 and 122.

Figure 2:
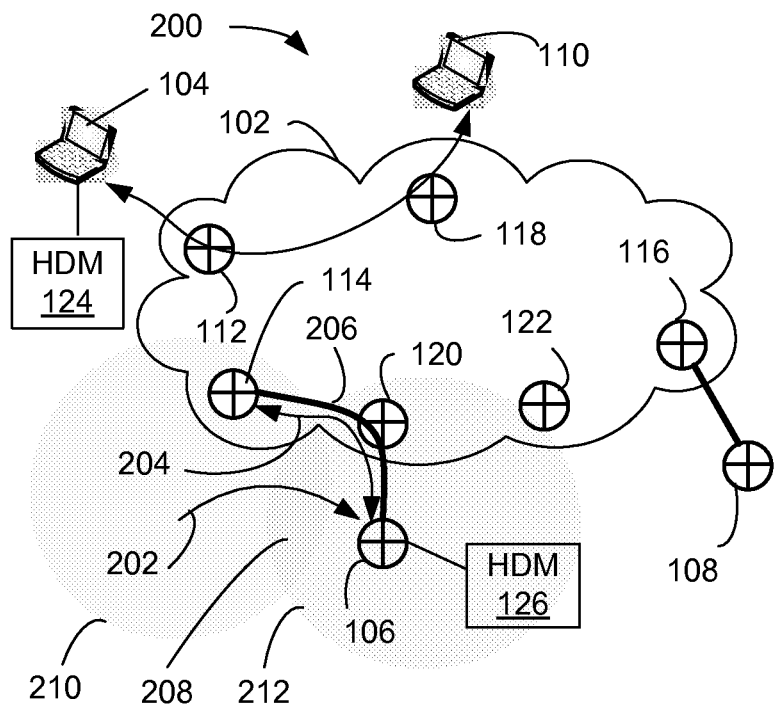
FIG. 2 is a graphical illustration of another exemplary network environment.

FIG. 2 is a graphical illustration of a network environment 200, wherein mobile router 106 has moved, or roamed from home agent 114 to access point 120, illustrated by arrow 202. Mobile router 160 may initiate a handover procedure, illustrated at 204, to inform home agent 114 of its new location. Handover may include authentication of mobile router 106. Mobile router 106 may send a binding update to home agent 114 with a new care-of-address corresponding to access point 120. Upon successful handover, home agent 114 may forward messages to mobile router 106 at the care-of-address, and mobile router 106 may interface with correspondent nodes, through a bi-directional tunnel 206.

Figure 3:
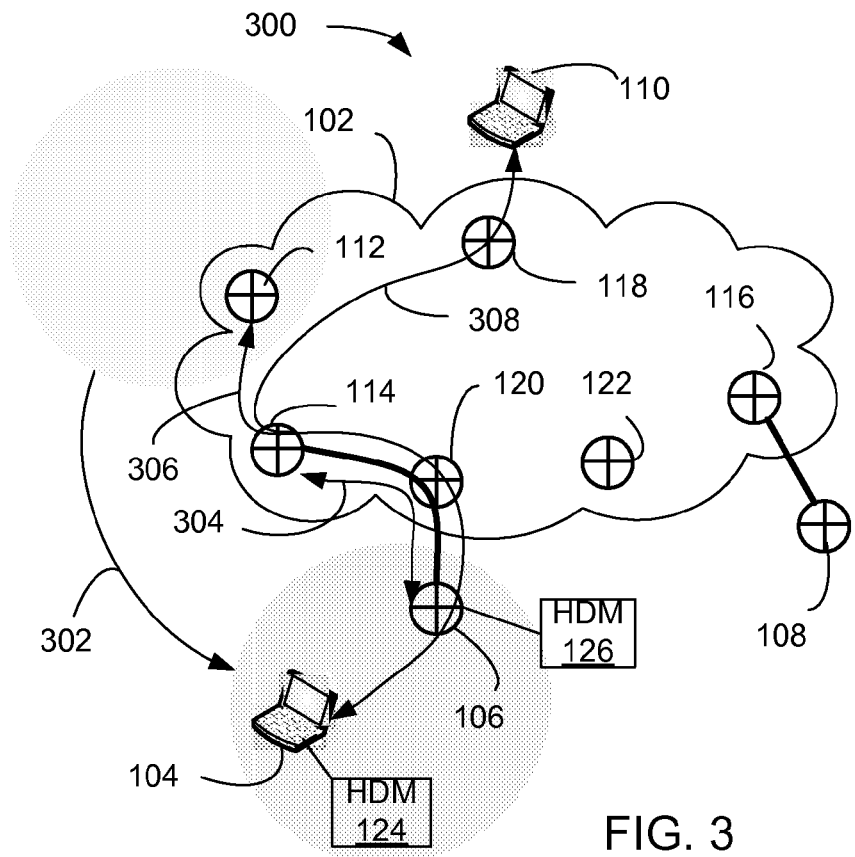
FIG. 3 is a graphical illustration of another exemplary network environment.

FIG. 3 is a graphical illustration of a network environment 300, wherein mobile host 104 has moved, or roamed from home agent 112 to mobile router 106, illustrated by arrow 302. Mobile host 104 may initiate a handover procedure to inform home agent 112 and/or home agent 114 of a new care-of-address, illustrated at 304 and 306. Handover may include authentication of mobile host 104. Handover may include sending bindings updates to one or more correspondent nodes of mobile host 104, such as correspondent node 110, illustrated at 308.

Figure 4:
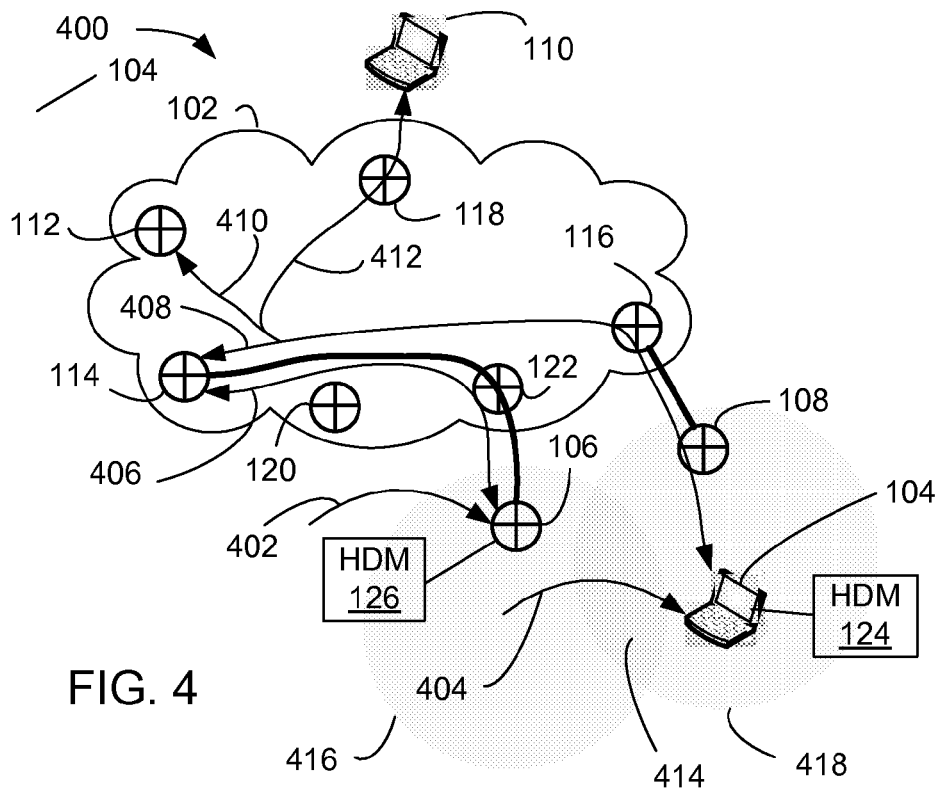
FIG. 4 is a graphical illustration of another exemplary network environment.

FIG. 4 is a graphical illustration of a network environment 400, wherein mobile router 106 has roamed from access point 120 to access point 122, illustrated by arrow 402, and mobile host 104 has roamed from mobile router 106 to mobile router 108, illustrated by arrow 404. Mobile router 106 and mobile host 104 may initiate handover procedures, illustrated at 406, 408, 410, and 412, to inform one or more home agents and correspondent nodes of a new care-of-address.

Conventionally, handover may not be initiated until a mobile node moves out of signal range of an existing access point and loses a corresponding network connection. Until the mobile node re-establishes a connection with another access point, messages directed to and from the mobile node are undeliverable, and may be buffered for later delivery.

Alternatively, a mobile node may include a handover decision module (HDM) to monitor wireless signal strengths associated with access points, and to initiate a handover procedure upon a crossing of one or more thresholds. As described below, an HDM may be initiated, or triggered, periodically by timer, which may be a software-based timer. Handover may thus be initiated prior to loss of an existing network connection. In the examples of FIG. 1 through FIG. 4, mobile host 104 and mobile router 106 include corresponding HDMs 124 and 126.

For example, in FIG. 2, where mobile router 106 is moving in the direction of arrow 202, a decision to initiate handover from home agent 114 to access point 120 may be made while mobile router 106 is in a signal overlap area 208 within a signal range 210 of home agent 114 and a signal range 212 of access point 120.

In FIG. 4, where mobile router 106 is moving in the direction of arrow 402, a decision to initiate handover from access point 120 to access point 122 may be made while mobile router 106 is within an area of overlap of signal ranges corresponding to access points 120 and 122.

Similarly in FIG. 4, where mobile host 104 is moving in the direction of arrow 404, a decision to initiate handover from mobile router 106 to mobile router 108 may be made while mobile host 104 is in a signal overlap area 414 within a signal range 416 of mobile router 106 and a signal range 418 of mobile router 108.

Initiating a handover procedure may include comparing one or more monitored signal strengths with one or more thresholds and or to one another, and determining to initiate a handover in response to results of the comparing.

A HDM may be implemented in software, firmware, and/or hardware, and may be integrated within a system configured to implement MIPv6, NEMO, and/or other mobile networking protocols.

Figure 5:
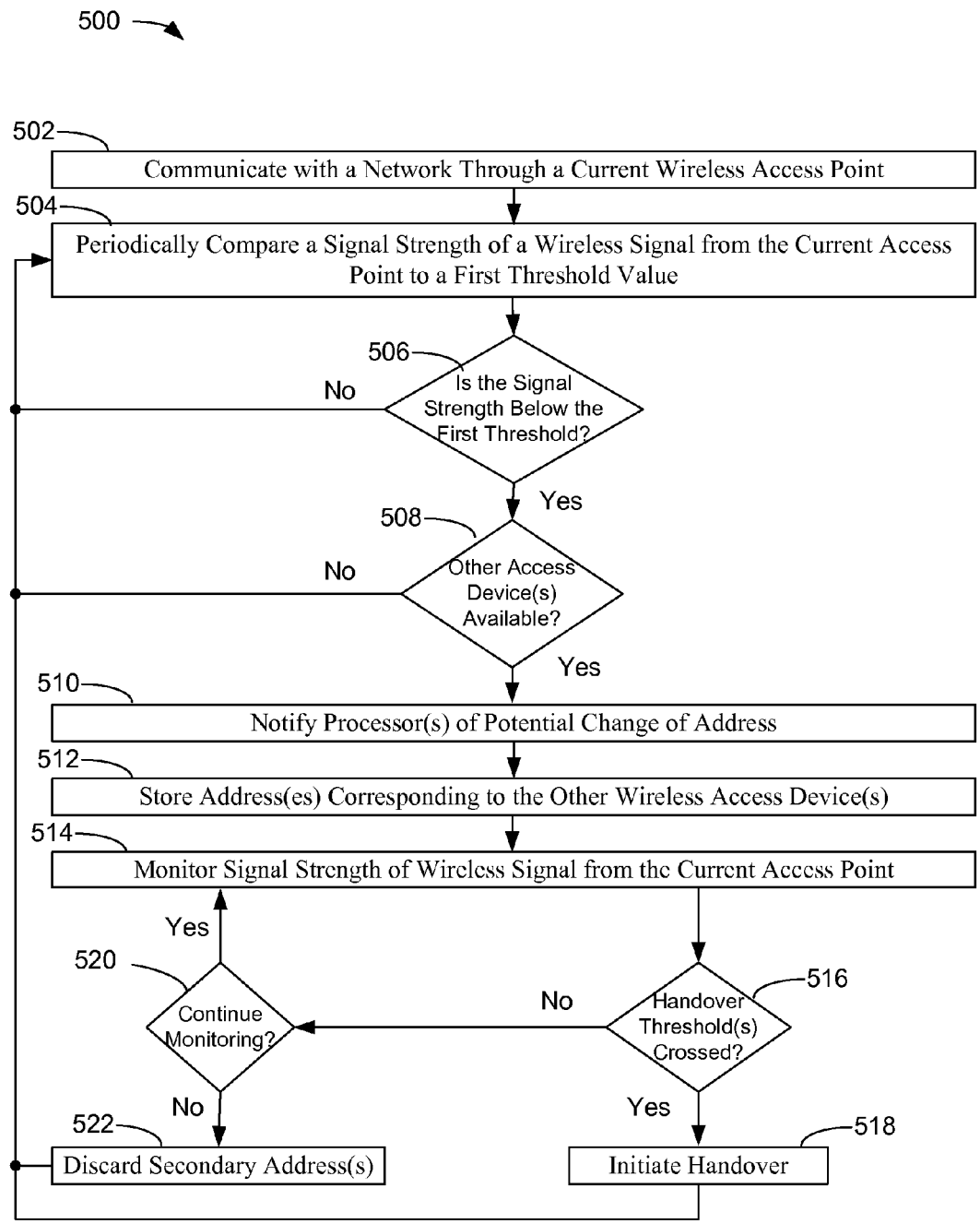
FIG. 5 is a process flowchart of an exemplary method.

FIG. 5 is a process flowchart of an exemplary method 500. Method 500 is described below with reference to FIGS. 6 for illustrative purposes. Method 500 is not, however, limited to the example of FIG. 6.

Figure 6:
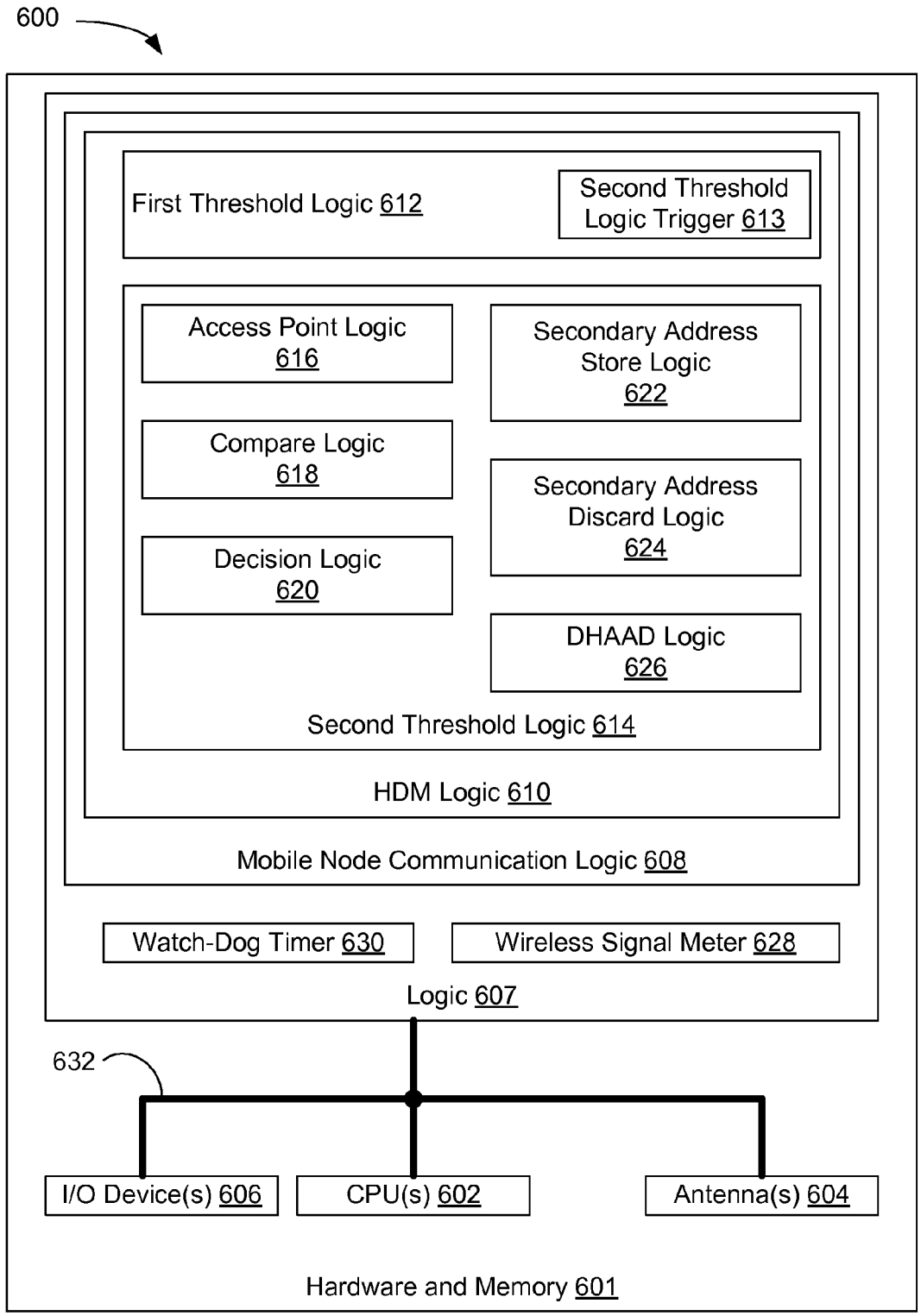
FIG. 6 is a block diagram of an exemplary mobile node.

FIG. 6 is a block diagram of an exemplary mobile node 600, which may be implemented as one or more of mobile host 104 and mobile router 106 in FIGS. 1-4.

Mobile node 600 includes hardware and memory 601, including one or more central processing units (CPUs) 602 to execute computer program product logic, also referred to herein as instructions or software. Mobile node 600 may include one or more antennas 604 and one or more input/output (I/O) devices 606, which may include one or more user interface devices.

Mobile node 600 includes logic 607, which may include one or more of integrated circuit logic and a computer readable medium having computer readable instructions stored therein to cause CPU(s) 602 to perform one or more functions in response thereto.

Logic 606 includes mobile node communication logic 608 to cause mobile node 600 to wirelessly communicate with a network. Mobile node communication logic 608 may include logic to cause mobile node 600 to wirelessly communicate with a network as one or more of a mobile host and a mobile router in accordance with MIPv6, NEMO, and/or other networking protocol(s).

Mobile node communication logic 608 includes HDM logic 610, described below with respect to method 500.

Mobile node 600 may include a communications infrastructure 632 to communicate data and/or instructions within mobile node 600.

Mobile node 600 may include one or more of wireless signal meter logic 628 to measure a wireless signal strength, and watch-dog timer logic 630, as described below with respect to method 500.

Referring to FIG. 5, at 502, a mobile node communicates with one or more networks through a current wireless access point.

At 504, a signal strength of a wireless signal from the current wireless access point is periodically compared to a first threshold value. The first threshold value may be set at a level that corresponds to an acceptable signal strength that is less than an ideal, desired, or maximum signal strength value. For example, on a scale of 1 to 10, the first threshold value may be set at approximately 7. The first threshold value may be user-controlled or user-selectable.

In the example of FIG. 6, HDM logic 610 may include first threshold logic 612 to cause CPU(s) 602 to obtain an indication of the signal strength from wireless signal meter 628, and to compare the signal strength to the first threshold value.

The periodic measurements at 504 may be performed at one or more of a variety of intervals, which may fixed or variable, and which may be user-controlled or event controlled. The periodic measurements may be initiated by a timer system, such as a watch-dog timer, implemented in software, firmware, hardware, and combinations thereof, as is well known in the art. In FIG. 6, mobile node 600 may include watch-dog timer logic 630 to cause CPU(s) 602 to initiate or call into first threshold logic 612.

At 506, when the signal strength of the current wireless access device is not below the first threshold, processing returns to 504. When the signal strength of the current wireless access device is below the first threshold, processing proceeds to 508.

At 508, a determination is made as to whether one or more other wireless access points are available. In FIG. 6, HDM logic 610 may include second threshold logic 614, which may include access point logic 616 to cause CPU(s) 602 to determine whether other wireless access points are available. First threshold logic may include second threshold trigger logic 613 to cause CPU(s) 602 to initiate second threshold logic 614 when the signal strength of the current wireless access device is below the first threshold.

In FIG. 6, second threshold logic 614 may include access point logic 616 to cause CPU(s) 602 to determine whether other wireless access points are available.

When other access points are not available, processing returns to 504.

When one or more other access points are available, notification of a potential roam may be sent at 510 to a processor system associated with one or more of the mobile node, such as CPU(s) 602 in FIG. 6, and one or more home agents and/or other routers. The notification may be used to cause the corresponding processor system to begin to allocate memory to store an address associated with the one or more other available access points.

In a MIPv6 and/or NEMO environment, the notification may be sent as a secondary address (S) bit in a header of a dynamic home agent address discovery (DHAAD) message. The (S) bit may be placed in a previously reserved bit space, similar to the "R" bit used to indicate mobile router status under NEMO.

In FIG. 6, secondary threshold logic 614 may include DHAAD logic 626 to cause CPU(s) 602 to set a bit in a header of a dynamic home agent address discovery message. Mobile host communication logic 608 may include logic to cause CPU(s) 602 to begin to allocate memory space in response to the set bit. Similarly, one or more home agents or other routers may include logic to cause a corresponding processing system to begin to allocate memory space in response to the set bit.

At 512, addresses associated with the one or more other available wireless access points are stored by the mobile node as a secondary address. In FIG. 6, secondary threshold logic 614 may include secondary address store logic 622 to cause CPU(s) 602 to store the secondary address(es). Similarly, one or more home agents or other routers may include logic to cause a corresponding processing system to store the secondary address(es).

At 514, the signal strength of the current wireless access point is monitored. Signal strengths of the one or more other available wireless access points may also be monitored.

At 516, the signal strength of the current wireless access point is compared to one or more handover threshold values. The signal strength of the one or more available other wireless access points may also be compared to one or more handover threshold values. When the handover threshold value(s) are crossed, a decision is made at 516 to initiate a handover at 518 to roam to one of the other available wireless access points.

The comparing at 516 may include comparing the signal strength of the current wireless access device to a second threshold value that is near or below an acceptable signal level. For example, on the scale of 1 to 10, the second threshold may be between 1 and 3. The second threshold value may be user-controlled or user-selectable.

The comparing at 516 may include comparing the signal strength of the one or more other available wireless access device to a third threshold value that is near or above an acceptable signal level.

The comparing at 516 may include comparing a difference between the signal strength of the current wireless access point and each of the signal strengths of the one or more other available wireless access devices, to a difference threshold value.

The comparing at 516 may include comparing signals strengths amongst a plurality of available other wireless access devices and selecting one having the strongest signal.

In FIG. 6, second threshold logic 614 may include compare logic 618 to cause CPU(s) 602 to compare signal strengths to one or more handover thresholds, and decision logic 620 to cause CPU(s) 602 to selectively initiate the handover at 518.

At 520, the monitoring and decision at 516 may be performed a single time and processing may return to 504. Alternatively, 516 may be repeated a number of times, and may be repeated more frequently than the periodic comparison at 504. Where 516 is repeated, it may be terminated upon an event or condition, such as expiration of a time period, one or more other threshold crossings, and combinations thereof.

Upon a return to 504, secondary addresses stored at 512 may be discarded. Discarding may be implemented by resetting the bit in the DHAAD message header.

The periodic comparing at 502 may be omitted, such that the monitoring at 514 may be performed upon detection of one or more other wireless access devices without waiting for the signal strength of the current wireless access device to fall below a threshold.

Methods and systems have been described above with the aid of functional building blocks illustrating the functions, features, and relationships thereof. At least some of the boundaries of these functional building blocks have been arbitrarily defined herein for the convenience of the description. Alternate boundaries can be defined so long as the specified functions and relationships thereof are appropriately performed.

One skilled in the art will recognize that these functional building blocks can be implemented by discrete components, application specific integrated circuits, processors executing appropriate software, and combinations thereof.

While various embodiments been described above, it should be understood that they have been presented by way of example only, and not limitation. It will be apparent to persons skilled in the relevant art that various changes in form and detail can be made therein without departing from the spirit and scope of the methods and systems disclosed herein. Thus, the breadth and scope of the claims should not be limited by any of the above-described exemplary embodiments.

What is claimed is:

1. A method, comprising:
   accessing a network from a mobile wireless system through a first wireless access point (AP);
   periodically determining if a signal strength of the first wireless AP is below a first threshold, at a first periodic rate;
   determining whether a second wireless AP of the network is available if the signal strength of the first wireless AP is determined to be below the first threshold;
   comparing the signal strength of the first wireless AP to a second threshold that is lower than the first threshold and comparing the signal strength of the second wireless AP to a third threshold, if the second wireless AP is determined to be available;
   determining to initiate a handover to access the network through the second wireless AP if the signal strength of the first wireless AP is determined to be below the second threshold and the signal strength of the second wireless AP is determined to be above the third threshold;
   notifying a network system of a potential handover of the mobile wireless system from the first wireless AP to the second wireless AP if the second wireless AP is determined to be available, prior to determining to initiate a handover; and
   allocating memory at the network system to store a network address associated with the second wireless AP and assigned to the mobile wireless system, upon receipt of notification of the potential handover;
   wherein the network system includes one or more of,
      a home agent of the mobile wireless system,
      a router associated with the mobile wireless system, and
      a correspondent node of the mobile wireless system.

2. The method of claim 1, further including:
   storing the network address associated with the second wireless AP in the allocated memory prior to the determining to initiate the handover.

3. The method of claim 1, further including:
   providing subsequent notice to the network system if the network address associated with the second wireless AP is to be discarded.

4. The method of claim 3, wherein:
   the notifying includes setting a bit in a field of a dynamic home agent address discovery message header to a first state; and
   the providing subsequent notice includes re-setting the bit.

5. The method of claim 1, further including repeating the comparing the signal strength of the first wireless AP to a second threshold that is lower than the first threshold and repeating the comparing the signal strength of the second wireless AP to a third threshold until one of:
   the determining to initiate a handover;
   the signal strength of the first wireless AP is determined to be above the first threshold; and
   expiration of a timer.

6. The method of claim 5, wherein the repeating includes repeating the comparing the signal strength of the first wireless AP to a second threshold that is lower than the first threshold and repeating the comparing the signal strength of the second wireless AP to a third threshold, at a second periodic rate that is higher than the first periodic rate.

7. A system, comprising a mobile wireless system to access a network through a first wireless access point (AP), wherein the mobile wireless access system includes:
   a first threshold system to periodically determine if a signal strength of the first wireless AP is below a first threshold, at a first periodic rate;
   an access point system determine whether a second wireless AP of the network is available upon a determination by the first threshold system that the signal strength of the first wireless AP is below the first threshold;
   a compare system to compare the signal strength of the first wireless AP to a second threshold that is lower than the first threshold and to compare the signal strength of the second wireless AP to a third threshold, upon a determination by the access point system that the second wireless AP is available;
   a decision system to determine to initiate a handover to access the network through the second wireless AP upon determinations by the compare system that the signal strength of the first wireless AP is below the second threshold and the signal strength of the second wireless AP is above the third threshold; and
   a notification system to notify a network system of a potential handover of the mobile wireless system from the first wireless AP to the second wireless AP upon a determination by the access point system that the second wireless AP is available, prior to a determination by the decision system to initiate a handover;
   wherein the network system is configured to allocate memory to store a network address associated with the second wireless AP and assigned to the mobile wireless system, upon receipt of notification of the potential handover; and
   wherein the network system includes one or more of,
      a home agent of the mobile wireless system,
      a router associated with the mobile wireless system, and
      a correspondent node of the mobile wireless system.

8. The system of claim 7, wherein the network system is further configured to store the network address associated with the second wireless AP in the allocated memory prior to a determination by the decision system to initiate the handover.

9. The system of claim 7, wherein the notification system is configured to provide subsequent notice to the network system if the network address associated with the second wireless AP is to be discarded.

10. The system of claim 9, wherein the notification system is further configured to:
set a bit in a field of a dynamic home agent address discovery message header to a first state to notify the network system of the potential handover; and
re-set the bit to provide the subsequent notice.

11. The system of claim 7, wherein the compare system is configured to repeatedly compare the signal strength of the first wireless AP to the second threshold and to repeatedly compare the signal strength of the second wireless AP to the third threshold until one of:
a determination by the decision system to initiate a handover;
the signal strength of the first wireless AP is determined to be above the first threshold; and
expiration of a timer.

12. The system of claim 7, wherein the compare system is configured to repeatedly compare the signal strength of the first wireless AP to the second threshold and to repeatedly compare the signal strength of the second wireless AP to the third threshold, at a second periodic rate that is higher than the first periodic rate.

13. A non-transitory computer readable medium encoded with a computer program, including instructions to cause a processor to:
access a network from a mobile wireless system through a first wireless access point (AP);
periodically determine if a signal strength of the first wireless access point is below a first threshold, at a first periodic rate;
determine whether a second wireless AP of the network is available if the signal strength of the first wireless AP is determined to be below the first threshold;
compare the signal strength of the first wireless AP to a second threshold that is lower than the first threshold and compare the signal strength of the second wireless AP to a third threshold, if the second wireless AP is determined to be available;
determine to initiate a handover to access the network through the second wireless AP if the signal strength of the first wireless AP is determined to be below the second threshold and the signal strength of the second wireless AP is determined to be above the third threshold;
notify a network system of a potential handover of the mobile wireless system from the first wireless AP to the second wireless AP, if the second wireless AP is determined to be available, prior to a determination to initiate a handover; and
allocate memory at the network system to store a network address associated with the second wireless AP and assigned to the mobile wireless system, upon receipt of notification of the potential handover;
wherein the network system includes one or more of,
a home agent of the mobile wireless system,
a router associated with the mobile wireless system, and
a correspondent node of the mobile wireless system.

14. The computer readable medium of claim 13, further including instructions to cause the processor to store the network address associated with the second wireless AP in the allocated memory prior to the determining to initiate the handover.

15. The computer readable medium of claim 13, further including instructions to cause the processor to provide subsequent notice to the network system if the network address associated with the second wireless AP is to be discarded.

16. The computer readable medium of claim 15, further including instructions to cause the processor to:
set a bit in a field of a dynamic home agent address discovery message header to a first state to notify the network system of the potential handover; and
re-set the bit to provide the subsequent notice.

17. The computer readable medium of claim 13, further including instructions to cause the processor to repeatedly compare the signal strength of the first wireless AP to the second threshold and to repeatedly compare the signal strength of the second wireless AP to the third threshold until one of:
a determination to initiate a handover;
the signal strength of the first wireless AP is determined to be above the first threshold; and
expiration of a timer.

18. The computer readable medium of claim 13, further including instructions to cause the processor to repeatedly compare the signal strength of the first wireless AP to the second threshold and to repeatedly compare the signal strength of the second wireless AP to the third threshold, at a second periodic rate that is higher than the first periodic rate.

* * * * *